United States Patent
Metz et al.

(10) Patent No.: US 9,866,714 B2
(45) Date of Patent: Jan. 9, 2018

(54) CREATION OF UNIFORM RESOURCE IDENTIFIERS INCLUDING A SCHEME NAME ASSOCIATED WITH A PRINT APPLICATION

(71) Applicant: Hewlett-Packard Development Company, L.P., Houston, TX (US)

(72) Inventors: Kristofer Erik Metz, Meridian, ID (US); Richard Erben, Boise, ID (US); Brian Hiatt, Eagle, ID (US); Jeffrey P Beery, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/326,889

(22) PCT Filed: Jul. 18, 2014

(86) PCT No.: PCT/US2014/047129
§ 371 (c)(1),
(2) Date: Jan. 17, 2017

(87) PCT Pub. No.: WO2016/010546
PCT Pub. Date: Jan. 21, 2016

(65) Prior Publication Data
US 2017/0208200 A1 Jul. 20, 2017

(51) Int. Cl.
*G06F 3/12* (2006.01)
*H04N 1/00* (2006.01)
(Continued)

(52) U.S. Cl.
CPC ....... *H04N 1/00938* (2013.01); *G06F 3/1205* (2013.01); *G06F 3/1228* (2013.01);
(Continued)

(58) Field of Classification Search
None
See application file for complete search history.

(56) References Cited

U.S. PATENT DOCUMENTS 6,738,156 B1    5/2004  Simpson et al.
7,006,243 B2 *  2/2006  Simpson ............... G06F 3/1205
                                                    358/1.1
(Continued)

FOREIGN PATENT DOCUMENTS

KR    20130126204 A    11/2013

OTHER PUBLICATIONS

Hutchings et al., "v4 printer driver—customized print preference," Microsoft Developer Network., Mar. 29, 2014 ~ 3 pages ~ <http://social.msdn.microsoft.com/.
(Continued)

*Primary Examiner* — Dung Tran
(74) *Attorney, Agent, or Firm* — HP Inc. Patent Department (57) ABSTRACT

Examples disclosed herein relate to creation of uniform resource identifiers (URIs) including a scheme name associated with a print application. Examples include acquisition of print content, creation of a URI including URI scheme name associated with a print application and a reference to a user-privileged storage location of a computing device for the print content. Examples further include performing an application programming interface (API) call including the URI to cause an operating system to launch the print application.

15 Claims, 4 Drawing Sheets (51) Int. Cl.
H04N 1/21 (2006.01)
G06K 15/02 (2006.01)
(52) U.S. Cl.
CPC .......... *G06F 3/1285* (2013.01); *G06K 15/02* (2013.01); *H04N 1/2166* (2013.01); *H04N 2201/0094* (2013.01)

(56) References Cited

U.S. PATENT DOCUMENTS

| | | | | |
|---|---|---|---|---|
| 8,553,264 | B2* | 10/2013 | Tsutsumi | G06F 3/1205 358/1.15 |
| 9,086,826 | B2* | 7/2015 | Ito | G06F 3/1204 |
| 2011/0090535 | A1 | 4/2011 | Towata | |
| 2012/0092689 | A1 | 4/2012 | Ito | |
| 2012/0105908 | A1 | 5/2012 | Tsutsumi | |
| 2012/0218580 | A1 | 8/2012 | Salgado et al. | |
| 2013/0073687 | A1 | 3/2013 | Cok et al. | |
| 2013/0163014 | A1 | 6/2013 | Xiao | |
| 2013/0235422 | A1 | 9/2013 | Nakata | |
| 2014/0104643 | A1 | 4/2014 | Park | |
| 2014/0344669 | A1* | 11/2014 | Kawara | G06F 17/214 715/234 |
| 2016/0021207 | A1* | 1/2016 | Dingwall | H04L 67/2814 709/203 |
| 2016/0072967 | A1* | 3/2016 | Yoshimura | H04N 1/00973 358/1.15 |

OTHER PUBLICATIONS

Microsoft, "Building Print-to-File Solutions for Windows 8," Sep. 28, 2012, <http://msdn.microsoft.com/ ~ 13 pages.
Microsoft, "Developing Windows Store Device Apps for Printers," Sep. 28, 2012, <http://www.microsoft.com/ ~ 103 pages.
Microsoft, "How to customize print settings (Windows Store device apps)," Jun. 23, 2014, <https://msdn.microsoft.com/ ~ 13 pages.
Microsoft, "V4 Printer Driver," Jun. 24, 2014, <http://msdn.microsoft.com/ ~ 83 pages.
Microsoft, "Windows Store device apps for printers," Jun. 23, 2014, <http://msdn.microsoft.com/ ~ 42 pages.
Microsoft, "How to handle URI activation (Windows Store apps using JavaScript and HTML)," Mar. 29, 2014, <http://msdn.microsoft.com/ ~ 3 pages.
Microsoft, "Printer Extensions," Mar. 29, 2014, <http://msdn.microsoft.com/ ~ 7 pages.
Microsoft, "Windows Store devices apps for Printers," Jan. 29, 2014, <http://msdn.microsoft.com/ ~ 1 page.
Tickler, C., "'One driver to rule them all' Secure Printing and Job Routing White Paper," Whiter Paper, Version 1.0, Jul. 27, 2009, found at http://www.canon.co.uk/ ~ 12 pages.
Wikipedia, "HP Universal Print Driver," Jul. 6, 2014, <http://en.wikipedia.org/wiki/HP_Universal_Print_Driver>. 8 pages.
Wikipedia, "URI Scheme," Jun. 29, 2014, <http://en.wikipedia.org/wiki/URI_scheme>. 11 pages.

* cited by examiner

CREATION OF UNIFORM RESOURCE IDENTIFIERS INCLUDING A SCHEME NAME ASSOCIATED WITH A PRINT APPLICATION

BACKGROUND

A printing device, such as a printer, multifunction printer (MFP), or the like, may be utilized to print content on a physical medium such as paper. The printing device may receive an electronic representation of the content from a computing device, such as a desktop or laptop computer, a mobile device, etc. In some examples, the computing device may include a print driver to render the print content into a print-ready format that the printing device is able to print and to provide the rendered print content to the printing device.

BRIEF DESCRIPTION OF THE DRAWINGS

The following detailed description references the drawings, wherein.

DETAILED DESCRIPTION

As noted above, a computing device may include a print driver to render print content into a print-ready format that a printing device is able to print, and to provide the rendered print content to the printing device. In some examples, a print driver architecture of an operating system may constrain the types of operations that a print driver may perform on a computing device. For example, the print architecture may prevent the print driver from presenting a user interface (UI) to receive input from a user of the computing device including the print driver, and may tie the print driver to a single print destination (e.g., a single port connected to a print destination, such as a printing device) at the time of installation of the print driver.

While such aspects of a print architecture may simplify print drivers to be used with the print architecture, these aspects may also prevent the print driver from implementing many features that may provide flexibility in usage of the print driver. For example, for simplicity of installation, a user may desire to install a print driver that is able to discover and print to a plurality of different print destinations (e.g., directly connected printing device(s), network printing device(s), remote printing service(s) such as cloud printing service(s), etc.). However, a constrained print driver of the above-described constrained print driver architecture may be prevented from displaying a UI to enable a user to select among different available print destinations based on, for example, print destinations availability at the time of the print operation, and may constrain the print driver to print to a single print destination selected at the time of the driver installation. In such examples, it may be difficult to provide a single print driver within the constrained print architecture that is able to be utilized with a plurality of different print destinations. Rather, the print driver architecture may attempt to constrain one print driver to one print destination.

To address these issues, examples described herein may utilize a protocol activation technique to launch a print application, not constrained by the print driver architecture, to handle print operations after a print driver of the constrained print driver architecture receives print content to be printed. In examples described herein, a computing device having an operating system (OS) may, with a print driver, acquire print content from a source application, and the computing device may further store the print content to a storage location in a user-privileged area of the computing device, accessible by a given OS user and a print application of the computing device. In such examples, the computing device may create a uniform resource identifier (URI) including a URI scheme name associated with the print application and a reference to the storage location for the print content, and perform an application programming interface (API) call including the URI, wherein the API call including the URI is to cause the OS of the computing device to launch the print application associated with the URI scheme name and provide the print application with the reference to the storage location of the print content.

In such examples, after the print content is provided to the print driver of the constrained print architecture, the print content may be a stored in a location accessible to a print application not constrained by the print architecture and the print application may be launched using a protocol activation technique. After launch, the print application may access the stored print content and provide functions not able to be provided by the print driver, such as displaying a UI to enable selection of a print destination among a plurality of print destinations, and provision of the print content to any selected print destination.

Figure 1A:
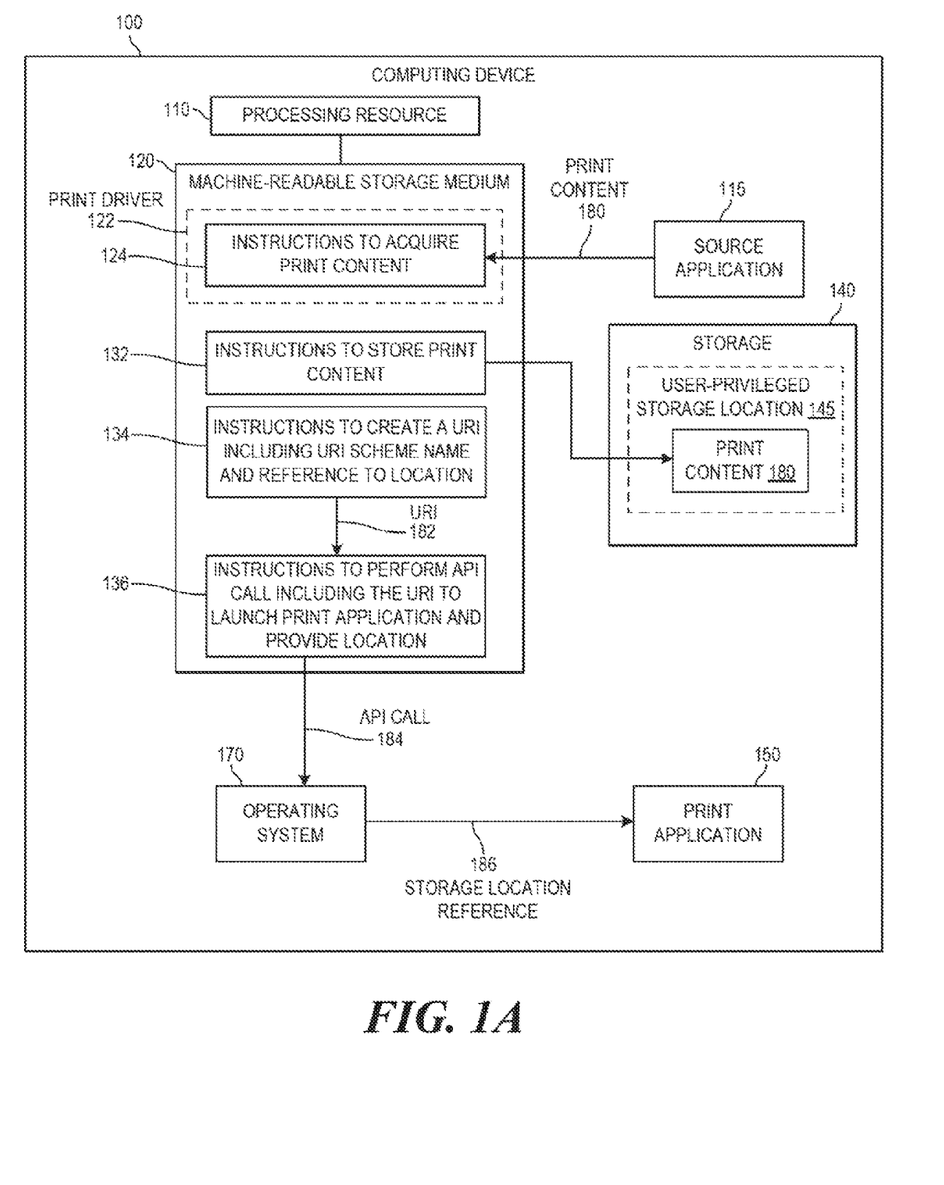
FIG. 1A is a block diagram of an example computing device to create a uniform resource identifier (URI) including a URI scheme name associated with a print application.

Referring now to the drawings, FIG. 1A is a block diagram of an example computing device 100 to create a uniform resource identifier (URI) 182 including a URI scheme name associated with a print application 150. As used herein, a "computing device" may be a desktop computer, notebook computer, workstation, tablet computer, mobile phone, smart device, server, blade enclosure, printing device, or any other processing device or equipment. Computing device 100 may include an operating system (OS) 170. In some examples, at least some processor executable instructions implementing OS 170 may be stored on storage medium 120 and may be executed by processing resource 110. In some examples, at least some processor executable instructions implementing OS 170 may be stored on at least one machine-readable storage medium other than storage medium 120.

In the example of FIG. 1A, computing device 100 includes a processing resource 110 and a machine-readable storage medium 120 encoded with instructions 124, 132, 134, and 136. In some examples, storage medium 120 may include additional instructions. In some examples, instructions 124, 132, 134, and 136, and any other instructions described herein in relation to storage medium 120, may be stored on a machine-readable storage medium remote from but accessible to computing device 100 and processing resource 110 (e.g., via a computer network). As used herein, a computer network may include, for example, local area network(s)(LAN(s)), wireless local area network(s) (WLAN(s)), virtual private network(s) (VPN(s)), the Internet, telephone network(s) (e.g., cellular telephone network(s)), or the like, or a combination thereof.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data and the like. For example, any machine-readable storage medium described herein may be any type of volatile memory (e.g., Random Access Memory (RAM), etc.), non-volatile memory, flash memory, storage drive (e.g., a hard drive), solid state drive, storage disc (e.g., a compact disc, a DVD, etc.), and the like, or a combination thereof. Further, any machine-readable storage medium described herein may be non-transitory.

In the example of FIG. 1A, instructions 124 may actively acquire (e.g., retrieve, etc.) or passively acquire (e.g., receive, etc.) print content 180 from a source application 115. In some examples, storage medium 120 may comprise executable instructions implementing a print driver 122 for computing device 100. In the example of FIG. 1A, the instructions implementing print driver 122 may include at least instructions 124 of storage medium 120. In such examples, by acquiring print content 180 with instructions 124, computing device 100 may acquire print content 180 from source application 115 with print driver 122 including instructions 124.

In the example of FIG. 1A, computing device 100 may comprise source application 115. In examples described herein, a "source application" may be a computer application to provide content to be printed to a print driver. Example source applications may include any computer application to create, edit, view, or otherwise manipulate data or other content that also includes a functionality to directly or indirectly provide the content to a print driver in response to receipt of a print command (e.g., selection of a print operation from a menu of the application, etc.). For example, source applications may include word processing applications, spreadsheet applications, presentation applications, image editing applications, or any other type of productivity computer applications, or the like.

In examples described herein, a "print driver" is a computer application to render (or convert) content to be printed (or "print content") into a print-ready format for at least one printing device. In some examples, print driver 122 may be a UI-constrained print driver to operate in a system context of OS 170 of computing device 100. In examples described herein, a "UI-constrained" print driver of a computing device is a print driver that is prevented, by the print driver architecture of the OS of the computing device, from presenting a UI to receive input from a user of the computing device. In examples described herein, operation in a system context of an OS comprises operation with system-level privileges of the OS and not in association with any particular OS user.

In some examples, print driver 122 may be a print driver to operate in a destination-constrained print architecture of OS 170 of computing device 100. In examples described herein, a "destination-constrained" print driver architecture of an operating system of a computing device is a print driver architecture in which a print driver is tied to a single print destination (e.g., a single port connected to a print destination, such as a printing device) at the time of installation of the print driver, wherein the print destination of the print driver may not be changed dynamically in association with performing a print operation. In some examples, print driver 122 may be a protocol-constrained print driver. In examples described herein, a "protocol-constrained" print driver is a print driver constrained by a print driver architecture of an OS to communicate with a print destination via a single type of communications protocol. In examples described herein, print driver 122 may be a UI-constrained print driver, a protocol-constrained print driver, a print driver to operate in a destination-constrained print architecture, or any combination thereof.

In the example of FIG. 1A, instructions 132 may store print content 180 to a user-privileged storage location 145 of computing device 100, accessible by a given OS user. In such examples, the OS given user may be an OS user that input a print command to source application 115 to thereby provide print content 180 to print driver 122. In examples described herein, an "OS user" (or "operating system user") is an entity defined by an OS of a computing device and associated with particular privilege(s) by which the OS grants access to resource(s) of the computing device. In such examples, a given OS user may have privilege(s) specific to the given OS user and not shared by other user(s). For example, the given OS user may have privilege(s) to access the user-privileged storage location 145 for the given OS user, while other OS user(s) do not. A particular OS user may be associated with a single individual (e.g., a single individual may log into the OS as the particular OS user and other individuals may not), or the particular OS user may be associated with multiple individuals (e.g., any of multiple individuals may log into the OS as the particular OS user).

In the example of FIG. 1A, computing device 100 includes storage 140, which may be implemented by at least one machine-readable storage medium, as described above. In examples described herein, a "user-privileged storage location" of a computing device is portion of storage of the computing device associated with a particular OS user such that the OS grants the particular OS user (or applications, processes, etc., operating in the user context of the OS user) access to the portion of storage, and prevents access by other OS user(s) not having the privileges associated with the particular OS user (or applications, processes, etc., operating in the user context of such an other OS user). In some examples, instructions 132 may create or otherwise identify the user-privileged storage location 145 before storing print content 180 there. For example, instructions 132 may create a directory in a file system of OS 170 to serve as the user-privileged storage location 145. In some examples, user-privileged storage location 145 may be accessible a print application 150 of computing device 100 when executing in a user context associated with the given OS user. In examples described herein, a computer application (or process, etc.) operating (or executing, etc.) in a "user context" associated with a particular OS user is a computer application operating with the privileges of the particular OS user. In some examples, a computer application operating in a user application associate with a particular OS user is operating "as" the particular OS user from the perspective of the OS.

In some examples, instructions 124 (e.g., the UI-constrained print driver 122) may output a plurality of versions of print content 180, each having a different file format, as described below in relation to FIG. 2. In such examples, instructions 132 may store each of the plurality of version of print content 180 to the user-privileged storage location 145.

Figure 1B:
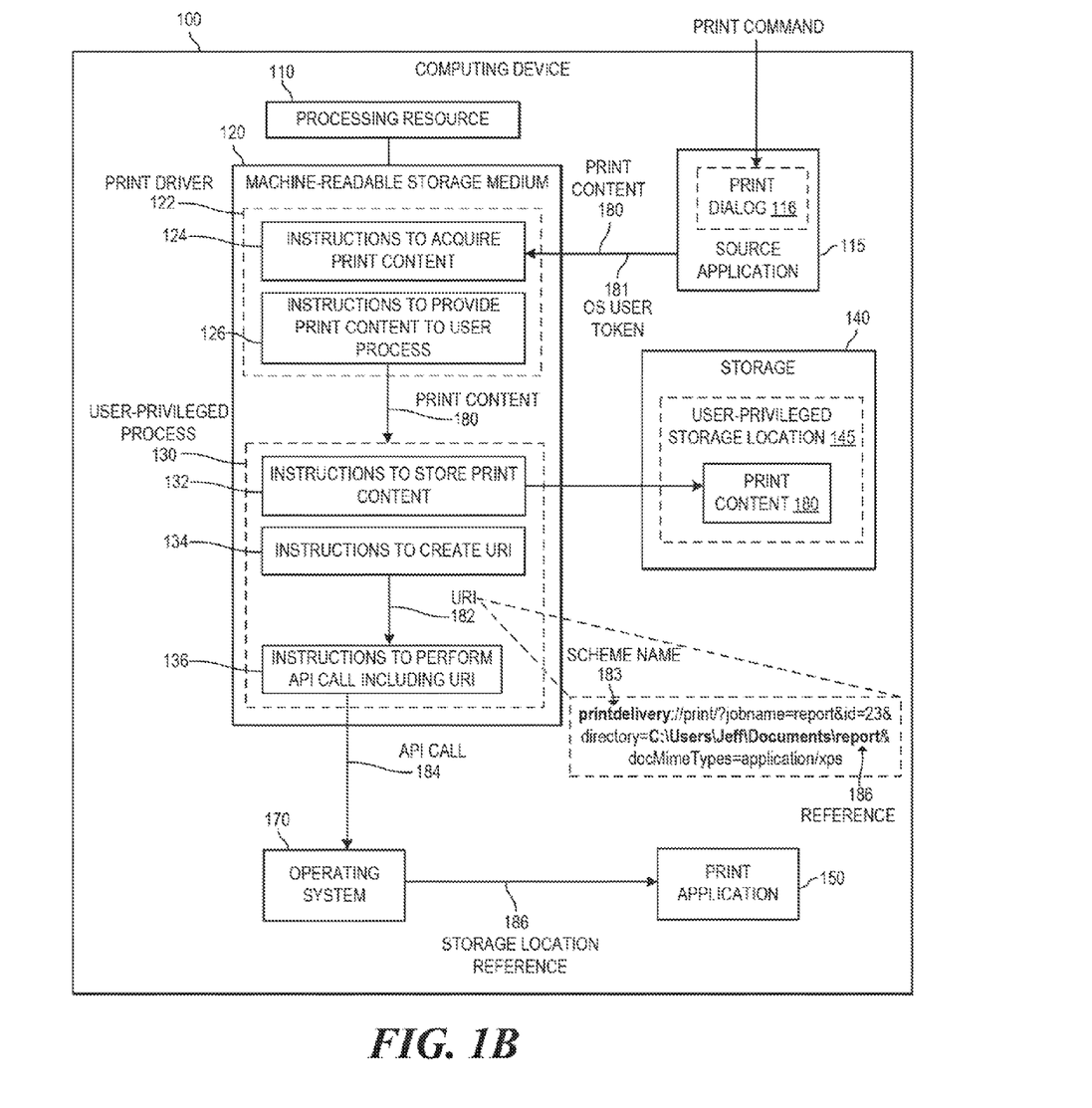
FIG. 1B is a block diagram of another example of the computing device of FIG. 1A to create a URI including a URI scheme name associated with a print application.

Instructions 134 may create a URI 182 including a URI scheme name associated with print application 150 and a reference to the storage location 145 for print content 180. An example of URI 182 is illustrated in FIG. 1B, which is described in more detail below. In the example of FIG. 1B, URI 182 may comprise: "printdelivery://print/?jobname=report&id=23&directory=C:\Users\Jeff\Documents\report &docMimeTypes=application/xps". In such examples, "printdelivery"is the URI scheme name (labeled 183 in FIG. 1B) and "C:\Users\Jeff\Documents\report" is a reference (labeled 186 in FIG. 1B) to the user-privileged storage location 145 for print content 180. In the example of FIG. 1B, the storage location 145 is in a "Documents" folder of an OS user having a user name "Jeff". Other information that may be included in the URI include an action to be performed (e.g., "print"), a job name (e.g., "report"), a job identifier (e.g., "23"), and an identification of the file format type of print content 180 stored in location 145 (e.g., "application/xps"). Although the action in the above example URI is "print", other actions could be included in URI 182 (e.g., "store", "OCR", etc.).

In some examples, instructions 134 may create URI 182 based on the acquisition of print content 180 with print driver 122. In some examples, instructions 134 may create the URI based on receipt of print content 180 by print driver 122 and based on identification (e.g., directory creation, etc.) of the user-privileged storage location 145. In some examples, instructions 132 may store print content 180 to storage location 145 before, after, or at least partially concurrent with the creation of URI 182 by instructions 134 and performance of API call 184 by instructions 136.

In the example of FIG. 1A, instructions 136 may perform an application programming interface (API) call 184 including URI 182. For example, instructions 136 may pass URI 182 as a parameter of the API call 184. When it includes URI 182, the API call 184 may cause the OS 170 of computing device 100 to launch print application 150 associated with URI scheme name 183 of URI 182 and provide print application 150 with reference 186 to the user-privileged storage location 145 of print content 180. For example, print application 150 of computing device 100 may declare support for (or otherwise be associated with) URI scheme name 183 for OS 170 such that OS may launch print application 150 in response to receiving the API call 184 including URI 182 comprising URI scheme name 183.

In some example, the API call 184 may be an API call to request that the OS execute an action on a file. For example, the API call 184 may be a "ShellExecute( )" API call. As described above, the API call 184 including URI 182 may cause OS 170 to provide print application 150 with reference 186 to storage location 145 for print content 180. In some examples, OS 170 may provide reference 186 to print application 150 providing URI 182 (including reference 186) to print application 150. In some examples, performing the API call including a URI having a URI scheme name associated with a particular application (e.g., print application 150) in order to launch the particular application may be referred to herein as a "protocol activation" technique.

In some examples, instructions 136 may perform API call 184 including URI 182 after the creation of URI 182 and without user input, such as any input to computing device 100 by a user of the computing device 100 via any input device (e.g., keyboard, pointing device such as a mouse, touch screen, microphone, or the like). For example, instructions 136 may perform the API call 184 after creation of URI 182 and without user input between the acquisition of print content 180 by print driver 122 and the performance of the API call 184.

In such examples, after print application 150 is launched and receives reference 186 to storage location 145 at which print content 180 is stored, print application may access print content 180 at storage location 145 based on reference 186. In some examples, print application 150 may be launched in a user context of OS 170 for the given OS user (e.g., that input the print command to source application 115) such that print application 150 has the appropriate privilege(s) to access print content 180 in user-privileged storage location 145. After being launched, print application 150 may also perform one or a plurality of print-related functionalities that print driver 122 may be prevented from performing (e.g., due to the print driver architecture of OC 170).

For example, as noted above, print driver 122 may be at least one of a UI-constrained print driver, a protocol-constrained print driver, and a print driver to operate in a destination-constrained print architecture. In some examples, print application 150 may be able to present a UI to a user of computing device to receive user input, such as a selection of one of a plurality of available print destinations, which a UI-constrained print driver is not able to do. In some examples, print application 150 may be able to select its print destination as part of a particular print operation and provide print content 180 to the selected print destination (e.g., the user selected destination), which a print driver to operate in a destination-constrained print architecture is not able to do. In some examples, print application 150 may be capable of communicating with print destination(s) (e.g., printing device, remote printing service, cloud printing service, etc.) via any given one of a plurality of communications protocols (e.g., Internet Printing Protocol (IPP), HTTP, TCP/IP, etc.), while protocol constrained print driver may be constrained to communicate with a print destination via a single protocol (e.g., TCP/IP).

In examples described here, a print destination may be any printing device or any service to which print content may be provided for printing on a printing device by the service. Examples of such services may include remote printing services (e.g., e-mail-based printing services, cloud printing services, etc.). In examples described herein, a "remote printing service" may be a service implemented by one or more networked computing devices to receive a print request from a sending computing device over a computer network and make available, to a printing device a computer network, content associated with the request, wherein the sending computing device and the destination printing device are each remote from the networked computing device(s) implementing the remote printing service.

In examples described herein, a "printing device " may be a hardware device, such as a printer, multifunction printer (MFP), or any other device including at least functionalities to physically produce graphical representation(s) (e.g., text, images, etc.) on paper, or the like, or to produce physical object(s) (e.g., a printing device for three-dimensional (3D) printing). In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

In some examples instructions 124, 132, 134, and 136 may be part of an installation package that, when installed, may be executed by processing resource 110 to implement the functionalities described herein in relation to instructions 124, 132, 134, and 136. In such examples, storage medium 120 may be a portable medium, such as a CD, DVD, or flash drive, or a memory maintained by a server from which the installation package can be downloaded and installed. In other examples, instructions 124, 132, 134, and 136 may be part of an application, applications, or component already installed on remote printing server 100 including processing resource 110. In such examples, the storage medium 120 may include memory such as a hard drive, solid state drive, or the like.

In some examples, instructions 132 may store print content 180 to storage location 145 before, after, or at least partially concurrent with the creation of URI 182 by instructions 134 and performance of API call 184 by instructions 136. In some examples, functionalities described herein in relation to FIG. 1A may be provided in combination with functionalities described herein in relation to any of FIGS. 1B-4.

FIG. 1B is a block diagram of another example of computing device 100 of FIG. 1A to create a URI 182 including a URI scheme name 183 associated with print application 150. In the example of FIG. 1B, computing device 100 comprises a processing resource 110, storage medium 120, storage 140, and OS 170, as described above in relation to FIG. 1A. In the example of FIG. 1B, computing device 100 also comprises source application 115 and print application 150, as described above in relation to FIG. 1A.

In the example of FIG. 1B, storage medium 120 includes at least instructions 126 in addition to the instructions of storage medium 120 described above in relation to FIG. 1A. As described above in relation to FIG. 1A, storage medium 120 may comprise executable instructions implementing a print driver 122 for computing device 100. In the example of FIG. 1B, the instructions implementing print driver 122 may include at least instructions 124 and 126 of storage medium 120. As described above, print driver 122 may be a UI-constrained print driver, a protocol-constrained print driver, a print driver to operate in a destination-constrained print architecture, or any combination thereof.

In the example of FIG. 1B, print driver 122 may acquire print content from source application 115 by instructions 124 actively or passively acquiring print content 180 from source application 115. In the example of FIG. 1B instructions 124 of print driver 122 may further acquire a user token 181 identifying a given OS user of computing device 100, such as the given OS user that input a print command to source application 115, via a print dialog UI 116, thereby triggering provision of print content 180 to print driver 122. In such examples, the given OS user of computing device 100 may input a print command to a print dialog UI 116 of source application 115. In response to the print command, source application 115 may provide print content 180 and user token 181 (identifying the given OS user) to print driver 122 (e.g., indirectly via OS 170). In some examples, user token 181 may be an OS-level object.

In the example of FIG. 1B, instructions 126 may utilize OS user token 181 to launch a user-privileged process 130 having the privileges of the given OS user identified by OS user token 181. For example, instructions 126 may pass the OS user token 181 to the OS 170 with an API call to launch process 130, such that OS 170 launches process 130 in the user context of the given OS user and having the privileges of the given OS user.

In response to the acquisition of print content 180, instructions 126 may provide print content 180 from print driver 122 to a user-privileged process 130 privileged to access each user-privileged storage location of computing device 100 accessible by the given OS user (i.e., the OS user that input the print command to source application 115), such as user-privileged storage location 145. In the example of FIG. 1B, storage medium 120 may comprise executable instructions implementing user-privileged process 130 for computing device 100. In such examples, the instructions implementing user-privileged process 130 may include at least instructions 132, 134, and 136 of storage medium 120. In such examples, functionalities performed by any of instructions 132, 134, and 136 may be considered functionalities performed by user-privileged process 130.

As described above in relation to FIG. 1A, instructions 132 may store print content 180 to user-privileged storage location 145 of computing device 100, accessible by the given OS user. In some examples, user-privileged storage location 145 may also be accessible to print application 150 of computing device 100 when operating in a user context associated with the given OS user. Instructions 134 may create a URI 182 including a URI scheme name 183 (bold in FIG. 1B) associated with print application 150 and a reference 186 to the storage location 145 for print content 180, as described above in relation to FIG. 1A. Reference 186 is illustrated in bold in FIG. 1B. In the example of FIG. 1B, instructions 134 of user-privileged process 130 may create URI 182 (i.e., process 130 may create URI 182).

As described above in relation to FIG. 1A, instructions 136 may perform an API call 184 including URI 182, wherein the API call is to cause the OS 170 of computing device 100 to launch print application 150 associated with URI scheme name 183 of URI 182 and provide print application 150 with reference 186 to the user-privileged storage location 145 of print content 180. In some examples, API call 184 including URI 182 may instruct print application 150 to access print content 180 at storage location 145 based on the reference 186 to storage location 145 included in URI 182. For example, API call 184 may cause OS 170 to launch print application 150 and provide URI 182 to print application 150. In such examples, the inclusion of the "print" action in the URI 182 may instruct print application 150 to access print content 180 using the reference 186 to storage location 145 and to perform a print operation on the accessed print content 180.

In the example of FIG. 1B, instructions 136 of user privileged-process 130 may perform the API call 184 (i.e., process 130 may perform API call 184). In the example of FIG. 1B, instructions 136 may perform API call 184 including URI 182 after the creation of URI 182 and without user input (e.g., input from a user to computing device 100 via at least one input device) after the input of the print command to source application 115.

In some examples, instructions 124, 126, 132, 134, and 136 may be part of an installation package that, when installed, may be executed by processing resource 110 to implement the functionalities described herein in relation to instructions 124, 126, 132, 134, and 136. In such examples, storage medium 120 may be a portable medium, such as a CD, DVD, or flash drive, or a memory maintained by a server from which the installation package can be downloaded and installed. In other examples, instructions 124, 126, 132, 134, and 136 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1B may be provided in combination with functionalities described herein in relation to any of FIGS. 1A and 2-4.

Figure 2:
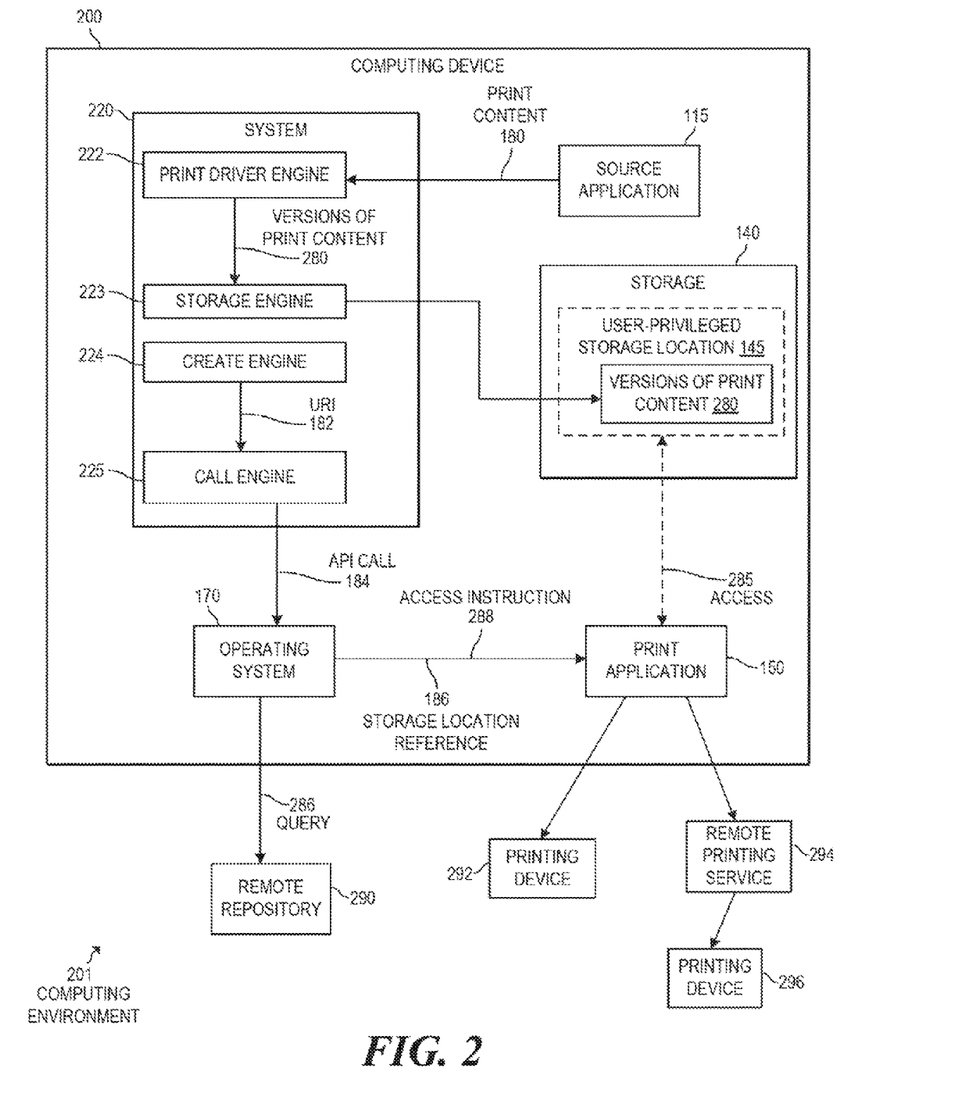
FIG. 2 is block diagram of an example computing environment including a system to create a URI including a reference to a in a user-privileged storage location of a computing device for print content.

FIG. 2 is a block diagram of an example computing environment 201 including a system 220 to create a URI 182 including a reference 186 to a user-privileged storage location 145 of a computing device 200 for print content 180. In the example of FIG. 2, computing environment 201 comprises computing device 200, a remote repository 290, printing devices 292 and 296, and a remote printing service 294.

In the example of FIG. 2, computing device 200 comprises a source application 115, storage 140, and an OS 170, as described above in relation to FIGS. 1A and 1B. In some examples, computing device 200 may comprise print application 150, as described above in relation to FIGS. 1A and 1B. In the example of FIG. 2, computing device 200 comprises system 220, which includes engines 222-225. Each of engines 222-225 of system 220 may be any combination of hardware and programming to implement the functionalities of the respective engine. In examples described herein, such combinations of hardware and programming may be implemented in a number of different ways. For example, the programming for the engines may be processor executable instructions stored on a non-transit machine-readable storage medium and the hardware for the engines may include a processing resource to execute those instructions. In such examples, the machine-readable storage medium may store instructions that, when executed by the processing resource, implement engines 222-225. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 222-225. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 220 including the processing resource. In such examples, the machine-readable storage medium may include memory such as a hard drive, solid state drive, or the like. In other examples, the functionalities of any engines of system 220 may be implemented in the form of electronic circuitry.

In the example of FIG. 2, a print driver engine 222 may at least partially implement a print driver of computing device 200. In some examples, the implemented print driver may be at least one of a UI-constrained print driver, a protocol-constrained print driver, and a print driver to operate in a destination-constrained print architecture. For example, the print driver at least partially implemented by engine 222 may be a UI-constrained print driver to operate in a system context of computing device 200, and a destination-constrained print driver constrained to print to a single print destination.

Print driver engine 222 may actively or passively acquire print content 180 from source application 115. In this manner, the print driver at least partially implemented by engine 222 may acquire print content 180 from source application 115. In some examples, print driver engine 222 may acquire a single version of print content 180 (e.g., print content 180 in a single file format) and output a plurality of versions 280 of print content 180, each version having a different file format. In such examples, engine 222 may receive print content 180 in a particular file format, such as the XML Paper Specification (XPS) file format, and may generate one or more additional versions of the print content 180 in other file format(s), such as, for example, a PostScript file format, a Portable Document Format (PDF) file format, or any other suitable file format. In some examples, versions 280 may include the version of print content 180 acquired by engine 222 from source application 115. In such examples, engine 222 may output the plurality of versions 280 of print content 180, including the acquired version of the print content 180 (i.e., in the particular file format in which it was acquired) and at least one generated version of print content 180 in a file format different from the format in which print content 180 was acquired by engine 222. In other examples, engine 222 may output a single version of the print content 180 in the file format in which it was received by engine 222 (i.e., without generating or outputting other versions of print content 180 in different file formats).

In some examples, outputting the print content by engine 222 may include providing the versions 280 to a storage engine 223, or otherwise making the versions 280 available to storage engine 223. In the example of FIG. 2, storage engine 223 may store print content 180 in a user-privileged storage location 145 accessible by a given OS user, as described above. In such examples, the user-privileged storage location is accessible by print application 150 when launched in the context of the given OS user, such that print application 150 has the privileges of the given OS user. In examples in which engine 222 outputs a plurality of versions 280 of print content 180, storage engine 223 may store each of the plurality of versions 280 of print content 180 in the user-privileged storage location 145, including the acquired version of print content 180.

In the example of FIG. 2, based on the acquisition of print content 180 by the print driver, a create engine 224 may create a URI 182 including a URI scheme name associated with print application 150 and a reference 186 to the user-privileged storage location 145 for print content 180.

In some examples, URI 182 may comprise an identification of a file format type indicating a file format in which print content 180 is stored in the storage location 145. In examples in which engine 222 outputs one version of print content 180, URI 182 may comprise an identification of a single file format type indicating the file format in which print content 180 is stored in storage location 145, as described above in relation to FIG. 1A.

In other examples in which engine 222 outputs multiple versions 280 of print content 180, create engine 224 may create URI 182 to include a respective identification of the file format type for each of the plurality of versions 280 of print content 180. For example, in an example in which engine 222 outputs print content 180 in each of an XPS file format, a PostScript file format, and a PDF file format, create engine 224 may create URI 182 to comprise: "printdelivery://print/?jobname=report&id=23&directory=C:\Users\Jeff\Documents\report&docMimeTypes=application/postscript:application/xps:application/pdf".

In such examples, "printdelivery" is the URI scheme name (labeled 183 in FIG. 1B) and "C:\Users\Jeff\Documents\report" is the reference 186 to the user-privileged storage location 145, "application/postscript" is the identification of the PostScript file format type, "application/xps" is the identification of the XPS file format type, and "application/pdf" is the identification of the PDF file format type. Other information that may be included in the URI 182 may include an action to be performed (e.g., "print"), a job name (e.g., "report"), and a job identifier (e.g., "23"), as described above.

In the example of FIG. 2, call engine 225 may, after the creation of URI 182, perform an API call 184 including URI 182 as a parameter of the API CALL 184, as described above. For example, when computing device 200 comprises print application 150, engine 225 may perform the API call 184 including URI 182 as a parameter of the API call 184, wherein the API call including the URI is to cause the OS 170 of computing device 200 to launch print application 150 associated with the URI scheme name of URI 182 and instruct 288 print application 150 to access print content 180 based on reference 186 to storage location 145 included in URI 182, as described above in relation to FIGS. 1A and 1B.

In such examples, in response to API call 184 including URI 182, OS 170 may determine whether any computer application of computing device 200 has declared support for the URI scheme name included in URI 182, or is otherwise identified as a computer application associated with the URI scheme name (e.g., to perform operation(s) based on a URI including the URI scheme name). In examples in which computing device 200 comprises print application 150 at the time of the API call 184, OS 170 may identify print application 150 as the computer application associated with the URI scheme name of URI 182 (e.g., "printdelivery", labeled 183 in the example of FIG. 1B), and, in response, launch print application 150 and instruct print application 150 to at least access 285 print content 180. In some examples, OS 170 may instruct print application 150 at least by providing URI 182 to application 150, as described above.

In the example of FIG. 2, after accessing 285 the print content 180 in storage location 145, print application 150 may provide the print content to any given one of a plurality of different print destinations. In such examples, print application 150 is able to select any of a plurality of print destinations, as described above, and provide content to the selected print destination for printing. For example, print application 150 may be able to print directly to at least one printing device 292. Each of the at least one printing device 292 may be connected to computing device 200 directly or over at least one computer network, for example. In some examples, print application 150 may also be able to provide punt content 180 to at least one remote printing service 294 for printing at any of at least one printing device 296 associated with the remote printing service.

In other examples, computing device 200 may not comprise print application 150, or any other application associated with the URI scheme name, at the time of API call 184. In such examples when the computing device does not comprise the print application, API call 184 is to cause the OS to query 286 a remote repository 290 for an application of remote repository 290 that has declared support for URI scheme name of URI 182. In such examples, OS 170 may determine that no computer application of computing device 200 is associated with the URI scheme name of URI 182, and may query the remote repository 290 (e.g., via a computer network) for an application that has declared support for the URI scheme name. In such examples, the remote repository may comprise a platform to search for and download computer applications. In such examples, the query 286 may initiate a process for selection, download, and installation of print application 150 to enable print application 150 to access and perform operations with (e.g., print) the print content 180.

As described above, in some examples, print driver engine 222 may at least partially implement a print driver for computing device 200. In some examples, engines 223-225 may at least partially implement a user-privileged process having the privileges of a given OS user (e.g., that input a print command at source application 115), as described above in relation to user-privileged process 130 of FIG. 1B. In such examples, engines 223-225 (and the user-privileged process they implement) are operable in a user context of a given OS user that input a print command at source application 115 such that they have the privileges of the given OS user.

In some examples, engine 223 may store print content 180 to storage location 145 before, after, or at least partially concurrent with the creation of URI 182 by engine 224 and performance of API call 184 by engine 225. In some examples, functionalities described herein in relation to FIG. 2 may be provided in combination with functionalities described herein in relation to any of FIGS. 1A, 1B, 3, and 4.

Figure 3:
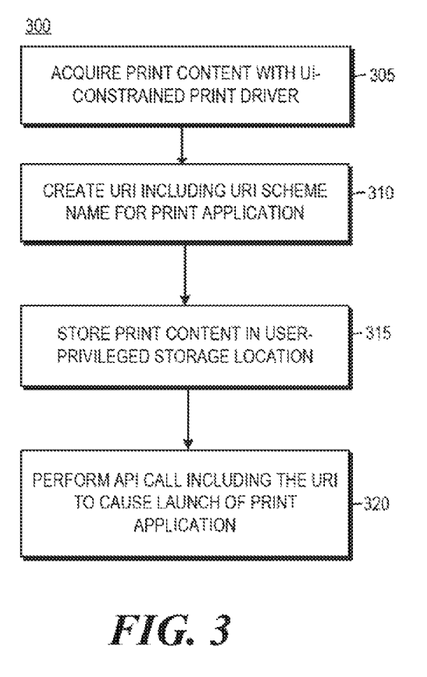
FIG. 3 is a flowchart of an example method for performing an API call including a created URI to cause an operating system (OS) to launch a print application.

FIG. 3 is a flowchart of an example method 300 for performing an API call including a created URI to cause an OS to launch a print application. Although execution of method 300 is described below with reference to computing device 100 of FIGS. 1A and 1B described above, other suitable computing devices for the executor of method 300 can be utilized (e.g., computing device 200 of FIG. 2). Additionally, implementation of method 300 is not limited to such examples.

At 305 of method 300, a UI-constrained print driver 122 may acquire print content 180 provided by source application 115 in response to receipt, by source application 115, of a print command input by a given OS user via a print dialog UI. In some examples, instructions 124 at least partially implementing punt driver 122 may acquire print content 180 provided by source application 115 at 305.

At 310, based on the acquisition of print content 180 by print driver 122, instructions 134 may create a URI 182 including a URI scheme name 183 associated with print application 150 and a reference 186 to a user-privileged storage location 145 of computing device 200 for print content 180. At 315, instructions 132 may store print content 180 in user-privileged storage location 145, the storage location 145 accessible by the given OS user and the print application 150 when operating (or executing, etc.) in a user context associated with the given OS user.

At 320, after the creation of URI 182, instructions 136 may perform an API call 184 including URI 182 as a parameter of the API call 184, wherein the API call 184 including URI 182 is to cause the OS 170 of computing device 200 to launch print application 150 associated with URI scheme name 183 and provide print application 150 with the reference 186 to the storage location 145 of the print content 180, when the computing device 200 includes the print application 150.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1A-2 and 4.

Figure 4:
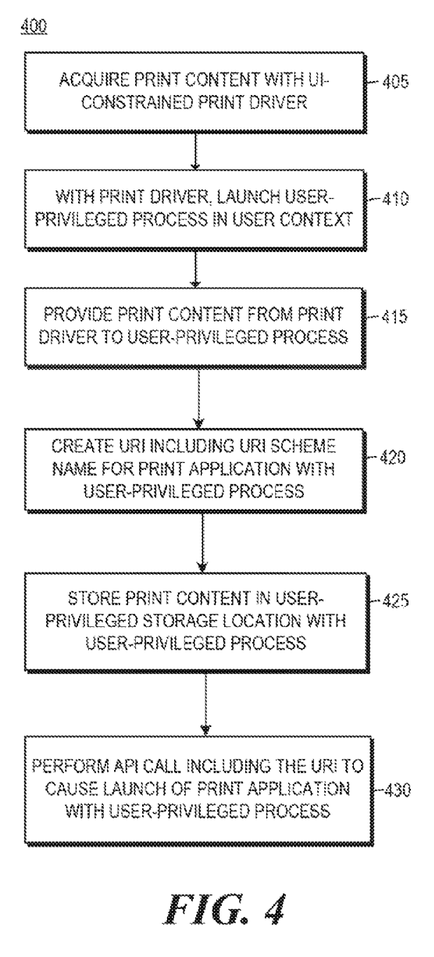
FIG. 4 is a flowchart of an example method for generating, with a user-privileged process, a URI including a URI scheme name associated with a print application.

FIG. 4 is a flowchart of an example method 400 for generating, with a user-privileged process, a URI including a URI scheme name associated with a print application. Although execution of method 400 is described below with reference to computing device 100 of FIGS. 1A and 1B described above, other suitable computing devices for the execution of method 300 can be utilized (e.g., computing device 200 of FIG. 2). Additionally, implementation of method 400 is not limited to such examples.

At 405 of method 400, a UI-constrained print driver 122 may acquire print content 180 provided by source application 115 in response to receipt, by source application 115, of a print command input by a given OS user via a print dialog UI. In some examples, instructions 124 at least partially implementing print driver 122 may acquire print content 180 provided by source application 115 at 305. In some examples, the UI-constrained print driver 122 (e.g., instructions 124) may further output a plurality of versions of print content 180, each having a different file format, as described above in relation to FIG. 2.

At 410, the UI-constrained print driver 122 (e.g., instructions 126 of FIG. 1B) may launch a user-privileged process 130 in a user context of computing device 200 associated with the given OS user, in response to acquiring print content 180. At 415, the UI-constrained print driver 122 (e.g., instructions 126 of FIG. 1B) may provide print content 180 from UI-constrained print driver 122 operable in a system context of computing device 200 to the user-privileged process 130. In some examples, the user-privileged process 130 may be privileged to access each user-privileged storage location of computing device 200 accessible by the given OS user associated with the input of the print command.

At 420, based on the acquisition of print content 180 by print driver 122, user-privileged process 130 (e.g., instructions 134 of FIG. 1B) may create a URI 182 including a URI scheme name 183 associated with print application 150 and a reference 186 to a user-privileged storage location 145 of computing device 200 for print content 180. At 425, user-privileged process 130 (e.g., instructions 132 of FIG. 1B) may store print content 180 in user-privileged storage location 145, wherein the storage location 145 is accessible by the given OS user and the print application 150 when executed in a user context associated with the given OS user. In some examples, URI 182 may additionally identify a respective file format type for each of the versions of print content 180 output by print driver 122.

At 430, after the creation of URI 182, user-privileged process 130 (e.g., instructions 136 of FIG. 1B) may perform an API call 184 including URI 182 as a parameter of the API call 184, wherein the API call 184 including URI 182 is to cause the OS 170 of computing device 200 to launch print application 150 associated with URI scheme name 183 and provide print application 150 with the reference 186 to the storage location 145 of the print content 180, when the computing device 200 includes the print application 150.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1A-3. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory machine-readable storage medium comprising instructions executable by a processing resource of a computing device having an operating system (OS) to:
   with a print driver, acquire print content from a source application;
   store the print content to a user-privileged storage location of the computing device, accessible by a given OS user;
   create a uniform resource identifier (URI) including a URI scheme name associated with the print application and a reference to the storage location for the print content; and
   perform an application programming interface (API) call including the URI, wherein the API call including the URI is to cause the OS of the computing device to launch the print application associated with the URI scheme name and provide the print application with the reference to the storage location of the print content.

2. The storage medium of claim 1, wherein:
   the instructions to create comprise instructions to, based on the acquisition of the print content with the print driver, create the URI; and
   the instructions to perform comprise instructions to, after the creation of the URI and without user input, perform the API call including the URI.

3. The storage medium of claim 2, wherein the print driver is a UI-constrained print driver to operate in a system context of the operating system of the computing device.

4. The storage medium of claim 3, wherein the UI-constrained print driver is to operate in a destination-constrained print architecture of the operating system of the computing device.

5. The storage medium of claim 4, wherein:
   the print driver is a protocol-constrained print driver constrained to communicate with a print destination via a single type of communications protocol; and
   the print application is capable of communicating with print destinations via any given one of a plurality of communications protocols.

6. The storage medium of claim 4, further comprising instructions to:
   in response to the acquisition of the print content, provide the print content from the print driver to a user-privileged process privileged to access each user-privileged storage location of the computing device accessible by the given OS user;
   wherein the instructions to create comprise instructions to create the URI with the user-privileged process; and
   wherein the instructions to perform the API call comprise instructions to perform the API call with the user-privileged process.

7. The storage medium of claim 1, wherein the instructions to require comprise instructions to:
   acquire an OS user token identifying are OS user of the computing device that input to the source application, via a print dialog user interface, a print command triggering provision of the print content to the print driver;

wherein the identified OS user is the given OS user; and wherein the instructions to perform comprise instructions to, after the creation of the URI and without user input after the input of the print command, perform the API call including the URI.

8. A system of a computing device comprising:

a print driver engine, implementing a print driver of the computing device, to acquire print content from a source application;

a create engine to, based on the acquisition of the print content, create a uniform resource identifier (URI) including a URI scheme name associated with a print application and a reference to a user-privileged storage location of the computing device for the print content;

a storage engine to store the print content in the user-privileged storage location accessible by a given OS user; and a call engine to, after the creation of the URI, perform an application programming interface (API) call including the URI as a parameter of the API call;

wherein the API call including the URI is to cause an operating system (OS) of the computing device to launch the print application associated with the URI scheme name and instruct the print application to access the print content based on the reference to the storage location included in the URI, when the computing device comprises the print application.

9. The system of claim 8, wherein, when the computing device does not comprise the print application, the API call is to cause the OS to query a remote repository for an application of the remote repository that has declared support for the URI scheme name of the URI.

10. The system of claim 8, wherein the URI comprises an identification of a file format type indicating a file format in which the print content is stored in the storage location.

11. The system of claim 8, wherein:

the print driver engine is to acquire a single version of the print content and output a plurality of versions of the print content, each version having a different file format;

the storage engine is to store each of the plurality of versions of the print content in the storage location; and the create engine is to create the URI to include a respective identification of the file format type for each of plurality of versions of the print content.

12. The system of claim 8, wherein:

the print driver is a UI-constrained print driver to operate in a system context of the computing device, and a destination-constrained print driver constrained to print to a single print destination; and the print application is to provide the print content to any given one of a plurality of different print destinations.

13. A method comprising:

acquiring, with a user interface (UI)-constrained print driver, print content provided by a source application in response to receipt, by the source application, of a print command input via a print dialog user interface (UI);

based on the acquiring, creating a uniform resource identifier (URI) including a URI scheme name associated with a print application and a reference to a user-privileged storage location of the computing device for the print content, the computing device including an operating system (OS);

storing the print content in the user-privileged storage location accessible by a given OS user; and after the creating, performing an application programming interface (API) call including the URI as a parameter of the API call, wherein the API call including the URI is to cause an operating system (OS) of the computing device to launch the print application associated with the URI scheme name and provide the print application with the reference to the storage location of the print content, when the computing device includes the print application.

14. The method of claim 13, further comprising:

with the UI-constrained print driver, launching a user-privileged process in an OS user context of the computing device in response to acquiring the print content; and providing the print content from the UI-constrained print driver operable in a system context of a computing device to the user-privileged process;

wherein the creating, storing, and performing the API call are each performed by the user-privileged process privileged to access each user-privileged storage location of the computing device accessible by a given OS user associated with the input of the print command.

15. The method of claim 14, further comprising:

with the UI-constrained print driver, outputting a plurality of versions of the print content, each having a different file format;

wherein the URI identifies a respective file format type for each of the output versions of the print content.

* * * * *

UNITED STATES PATENT AND TRADEMARK OFFICE
CERTIFICATE OF CORRECTION

PATENT NO. : 9,866,714 B2  
APPLICATION NO. : 15/326889  
DATED : January 9, 2018  
INVENTOR(S) : Kristofer Erik Metz et al.

It is certified that error appears in the above-identified patent and that said Letters Patent is hereby corrected as shown below:

In the Claims

In Column 14, Line 65, in Claim 7, delete "require" and insert -- acquire --, therefor.

In Column 14, Line 66, in Claim 7, delete "are" and insert -- an --, therefor.

In Column 16, Line 33, in Claim 14, delete "print content:" and insert -- print content; --, therefor.

Signed and Sealed this  
Nineteenth Day of November, 2019

Andrei Iancu  
*Director of the United States Patent and Trademark Office*